Nov. 19, 1935. J. KOLARZ 2,021,557
POWER CURRENT TRANSMISSION WITHIN LIMITED DISTRICTS
Filed Nov. 27, 1931 2 Sheets-Sheet 1
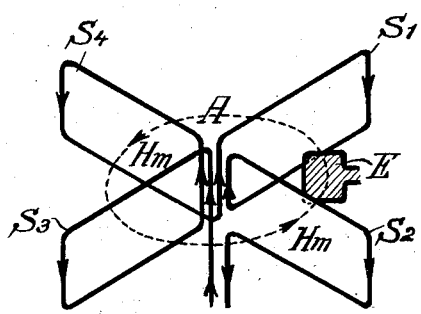
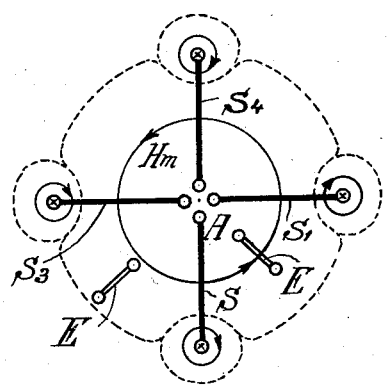
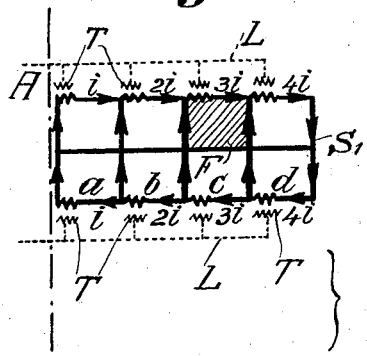
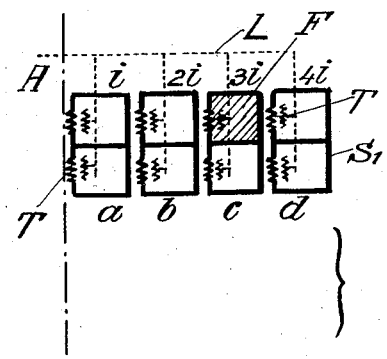
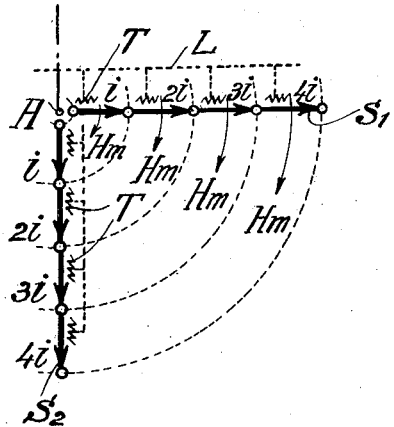
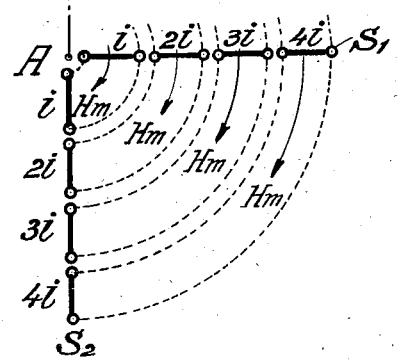

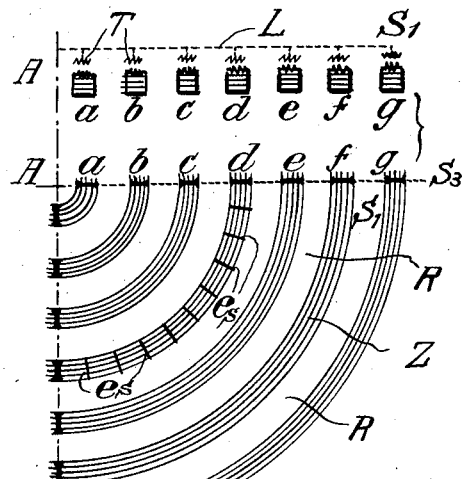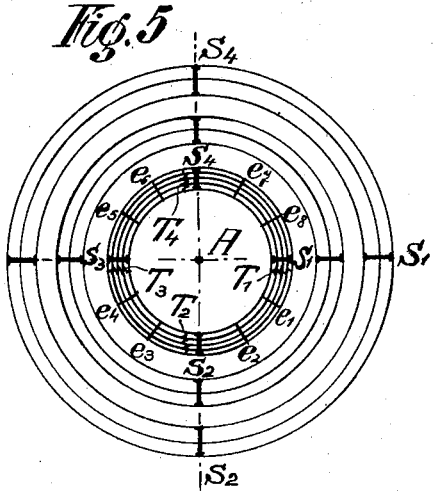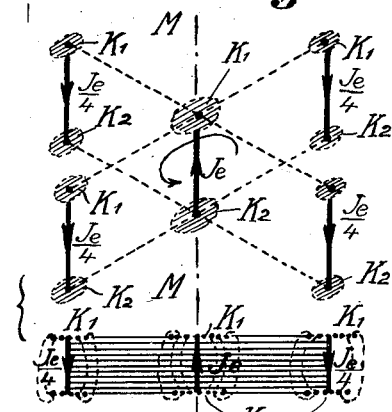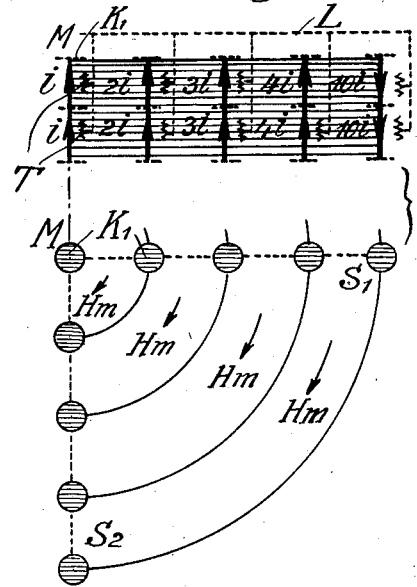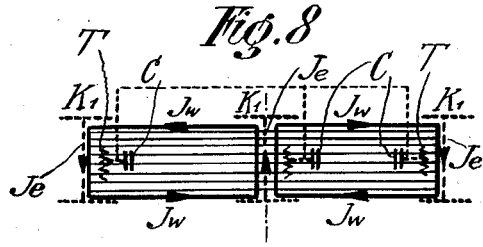

Patented Nov. 19, 1935

2,021,557

UNITED STATES PATENT OFFICE 2,021,557

POWER CURRENT TRANSMISSION WITHIN LIMITED DISTRICTS

Josef Kolarz, Rodaun, near Vienna, Austria

Application November 27, 1931, Serial No. 577,726
In Austria December 23, 1930

3 Claims. (Cl. 250—2)

Hitherto the transmission and distribution of the electric energy produced in the central stations was effected exclusively with overhead or underground conductors which lead to the current consumers. It is only possible during night service to also transmit electric energy without wire conductors, but hitherto it was not possible with such plants to supply consumers through the open space with large quantities of energy, for example for power and illuminating purposes.

This invention relates to a power current sending plant for transmitting and distributing electric energy through the open or built over space, and it consists in that high frequency alternating current flows through two or more sender sectors preferably arranged radial and star-shaped to the centre of the district to be supplied with current, so that an electro-magnetic field without considerable leakage is produced, the effective range of which is limited by the width and height of the sender sectors, whereas electric energy can be received by induction effect by receivers (windings or loops of secondary type) which are set up in the magnetic field area.

Several embodiments of the invention are illustrated by way of example in the accompanying drawings in which Figs. 1 to 8 show diagrammatically the construction and wiring of the different senders.

In the energy consumption district two, three, four or even more suitably high and wide conductor loops (windings) are grouped in star shape, and all these large windings are connected in series or in parallel to a source of high frequency current. In Fig. 1 for example four such conductor loops $S_1$ to $S_4$ are arranged in star shape around the centre A. A high frequency current flowing through these windings produces an electromagnetic field, the magnetic lines of force of which assume substantially the cross-section illustrated in Fig. 2 which represents approximately the effect area of the plant.

If the frequency of the source of alternating current and the exciting current flowing through the windings is sufficiently great, it is possible to receive in the magnet field area shown in Fig. 2 electric energy for electric illumination, power purposes and the like by means of suitably dimensioned conductive structures E like a frame antenna in the radio. The whole of the energy flowing in the large (primary) windings can thus be distributed or transmitted by induction effect to many smaller (secondary) windings of the receiver within the area of the lines of force or the effect area.

The effect area is therefore determined by the size of the primary windings; outside of this area all induction effect and possibility of energy transmission ceases. The entire plant is to a certain extent similar to a huge transformer, with the difference that the iron core is lacking and that the secondary windings, receivers E, although numerous are usually smaller as compared to the primary loops (senders). For the sake of simplicity the primary windings, arranged in star shape in the current distribution area, will be hereinafter referred to as sender plant or the individual winding loops thereof as sender sectors ($S_1$ to $S_4$) and the smaller secondary frame windings as the current consumers or receivers (E).

In order to form an approximate idea concerning the efficiency of such an energy distribution plant a practical example will be hereinafter given:—

For supplying a small town about 2 kms. in diameter a working frequency of 100 kiloherz and four sender sectors are provided. The necessary existing current for the inducing magnetic field amounts to about 315 amps. at 4400 volts per sender sector. Each sender sector has a length of 2000/2=1000 mtrs. with a height of about 20 mtrs. The average voltage induced per square metre of the receiving winding surface amounts to about 0,22 volts or in a receiver loop of 15×33⅓ mtrs.=500 sq. mtrs. a total voltage of about 110 volts results at which already quite considerable quantities of energy can be received.

The energy of about 315 amp. per sector mentioned in the example serves exclusively only for maintaining the electro-magnetic field in the effective range of the sender and lags about 90° behind the sender voltage. For this reason the exciting current is wattless exactly like the magnetizing current in an ordinary power current transformer. The greater the working frequency is, the smaller will be the exciting current and the average space field strength the efficiency of the plant being the same and inversely. Therefore, in order to bring the exciting current and consequently the copper mass of the sender to a minimum value, a corresponding high frequency must be chosen.

The greater the effective range is the greater must be the working efficiency.

The power current sending plant above described presents the advantage of great simplicity, but it can only be employed for certain special purposes and for short ranges. In order to produce a transmitting plant for greater ranges with absolutely uniform energy transmission, the following arrangement is made: The simple sender sectors $S_1$ to $S_4$ as shown in Figs. 1 and 2 are replaced by grid shaped sectors in closed construction as shown in Fig. 3, or in electrically separated form as shown in Fig. 4 or 4a. In each of the resulting part cross sections F (windows) of a sender sector a separate transformer acts for the space field excitation and for the energy delivery. All these separate transformers T in each sender sector are connected in parallel to a supplying conductor L extending along the sectors.

By means of the grid-shaped sector construction working conditions are established, which correspond to all practical requirements, which will be herein set forth. Thus the magnetic field, which in top plan view is substantially circular, is divided into annular portions, which are independent the ones of the others (Fig. 5). The sector transformers, for example $T_1$ to $T_4$ in this part work absolutely independently from all others in the space field excitation and energy delivering only in the annular space belonging thereto, as indicated by cross hatching in Fig. 5. All receivers situated in the window cross section belonging thereto (Fig. 5) are exclusively excited and supplied with energy by the above mentioned transformers $T_1$ to $T_4$.

In the middle of each window cross section $a$, $b$, $c$, $d$, ... (Figs. 3 to 5) the average space field potential is maintained at a certain value H$m$, so that the energy delivering conditions at each point in the effective range of the entire transmitter plant become equally favourable.

Further by possible phase shiftings of the magnetic field of neighbouring window cross sections the occurring of higher receiving voltages in larger metal constructions, where an induction effect is not desired, can be partly or entirely avoided.

By a multiple horizontal transmitter subdivision it is possible to equalize also the different heights of the receivers favourably for the receiving conditions (Figs. 3 and 4).

Finally, the sender subdivision allows the energy supply to be stopped in the separate annular space layers, the other portions of the transmission range remaining absolutely uninfluenced and undisturbed. By reducing the separate sender windows $a$, $b$, $c$, $d$ ... in the sectors according to Fig. 4a, it is possible to reduce the quantity of sender copper and with the aid of the receiver loops $e_s$ excited by the condensers, as will be hereinafter better explained, to force the exciting magnetic field into quite particular channels. Each sender and receiver loop, so to speak, surrounds the corresponding annular magnetic field. Between these separate annular magnetic fields Z free spaces R (Fig. 4a) are produced, which may then serve for other transmission purposes, such as wireless, town illumination and the like. Owing to the channel-shaped arrangement of the several magnetic fields it is possible, with the aid of the excited receiver, to deflect or shift the power current from such objects, where an induction effect for certain technical reasons would be undesirable or otherwise disadvantageous.

All receivers $e_1$, $e_2$, $e_3$ ... $e_8$ (indicated by hatching in Fig. 5), situated in the annular part area of the sender, are supplied with current by the transformers situated in the sender parts $s_1$, $s_2$, $s_3$, $s_4$ and they are connected up in parallel.

The total efficiency of the transformers $T_1$, $T_2$, $T_3$, $T_4$ must therefore be sufficient for supplying all the receivers situated in this ring.

In order to make the receiving conditions in the entire effective range equally favourable it is necessary, as already stated, for the average density of the lines of force H$m$ to be uniformly great in each annular section. For this reason the exciting current strength increases step-wise from the middle of the sender in each part sector up to the boundaries of the transmission range, as indicated in Figs. 3 and 4 ($i$, $^2i$, $^3i$, $^4i$). In the case of uniformly dense reception however the energy delivering increases towards the edges of the area and consequently the individual sender section portions must be provided with conducting cross section gradually increasing from the middle towards the outer side. If the efficiencies to be transmitted or the working frequence are too small, the exciting current potential, according to which the sender would then to be dimensioned, must be rather large. This objection is overcome in the following manner:

On the end terminals of each energy receiver an accordingly dimensioned condenser is connected in parallel and permanently. All these receiver blind currents, moving 90° in advance of the receiving voltage, then reduce the energy current in the sender according to the laws of energy transmission, it being even possible in this manner to produce the entire space field excitation by all receivers alone, whereas the sender only deals with the watt current. Moreover a much more favourable and more uniform distribution of the lines of force is thus obtained than when the sender sectors, which are mostly limited in number and which in this case can even be reduced to one sector, effect the excitation.

If in the simplest four-part sender plant according to Fig. 1, the horizontal connections are omitted and so to speak as a substitute therefor suitably large metal collecting surfaces $K_1$ and $K_2$ for the electricity are arranged on the vertical ends of the sender part becoming free (Fig. 6), the sender plant will thus be considerably simplified and an open sender plant is made of the closed sender. It is possible with this plant, as with the closed sender, to transmit energy and to also limit the effective range, if size and direction of the exciter currents $Je$, as indicated in Fig. 6, are maintained.

Also the number of sender sectors can be increased and, if necessary, reduced. The exciting current however in this case does not flow, as in Fig. 1, through the windings, but oscillates between the capacity surfaces $K_1$ and $K_2$. However, for obtaining a uniform energy transmission each sender sector must also in this case be subdivided as is indicated in this instance with one sector in Fig. 7.

The exciting current increases from the centre of the plant M—M to the edge of the magnetic field range; on the edges the existing current flows downwards in the total sum of the upward flowing part currents. All separate transformers T for supplying energy to the annular part ranges are connected to a supply conductor L arranged along the senders sectors. In order to prevent the capacity surfaces from becoming too large, higher frequencies are necessary for the service, which can be reduced again, if the receivers are utilized for space field excitation in an analogous manner as with the closed sender.

A combination of closed and open sender sectors in one plant may be called a "combined sender plant". Construction and connection of two sectors are shown in Fig. 8 in simplest undivided construction. The vertical sender conductors with the capacity surfaces $K_1$ and $K_2$ in the centre and at the edge of the effective range normally serve for producing the electromagnetic space field and only the exciting current $Je$ for the space field excitation oscillates in these portions.

The closed sender windings however have to take up the watt-current $Jw$ at the energy delivering. The supply is normally effected through transformers T with condenser C connected in parallel, directly in the open and closed senders simultaneously.

For uniform distribution of energy a practical subdivision of the plant is also necessary as in the closed and open senders.

The advantage of this combined plant is a favourable utilization of the sender copper cross sections at higher frequencies the somewhat more complicated subdivision having however to be put up with.

I claim:—

1. A power current transmitter plant of restricted range, comprising a plurality of sender aerials composed merely of vertical conductor sections with metallic current connecting surfaces at their ends, said aerials fed by a source of high frequency current, and forming a group of separate oscillating circuits normally distributed regularly in the center and on the edges of the effective range of the transmission so that the high frequency excitation currents in the center are displaced through 180 electric degrees relatively to the excitation currents at the limits of the effective range and the total values of both kinds of currents are always relatively equal.

2. A power current transmitter plant as specified in claim 1, in which all the aerials are interconnected and fed by a common source of high frequency current.

3. A power current transmission plant as specified in claim 1, in which each aerial is fed by a separate source of high frequency current.

JOSEF KOLARZ.